United States Patent [19]

Studer

[11] Patent Number: 4,841,204

[45] Date of Patent: Jun. 20, 1989

[54] COMBINATION ELECTRIC MOTOR AND MAGNETIC BEARING

[76] Inventor: Philip A. Studer, 10313 Ridgemoore Dr., Silver Spring, Md. 20901

[21] Appl. No.: 105,256

[22] Filed: Oct. 7, 1987

[51] Int. Cl.$^4$ .......................... F16C 39/06; H02K 7/09
[52] U.S. Cl. .................................... 318/254; 318/138; 310/90.5
[58] Field of Search ................ 318/138, 254; 310/90.5

[56] References Cited

U.S. PATENT DOCUMENTS

| | | | |
|---|---|---|---|
| 3,845,996 | 11/1974 | Geweke | 310/90.5 |
| 4,077,678 | 3/1978 | Studer et al. | 310/90.5 |
| 4,090,745 | 5/1978 | Dohogne et al. | 310/90.5 |
| 4,121,143 | 10/1978 | Habermann et al. | 310/90.5 X |
| 4,381,875 | 5/1983 | Studer | 310/90.5 |
| 4,556,828 | 12/1985 | Thompson | 318/254 |
| 4,626,754 | 12/1986 | Habermann et al. | 310/90.5 X |
| 4,686,404 | 8/1987 | Nakazeki et al. | 310/90.5 |

FOREIGN PATENT DOCUMENTS

| | | | |
|---|---|---|---|
| 048510 | 10/1985 | European Pat. Off. | 310/90.5 |
| 2537597 | 3/1977 | Fed. Rep. of Germany | 310/90.5 |
| 58-54220 | 3/1983 | Japan | 310/90.5 |
| 58-65321 | 4/1983 | Japan | 310/90.5 |
| 59-106721 | 6/1984 | Japan | 310/90.5 |
| 8400198 | 1/1984 | PCT Int'l Appl. | 310/90.5 |

Primary Examiner—Bentsu Ro
Attorney, Agent, or Firm—William L. Gates

[57] ABSTRACT

A brushless DC motor is disclosed wherein armature forces can be produced and controlled as both radial forces and as torque couples. A structure is described in which the normal radial destabilizing forces due to the high levels of magnetic flux linking the stator and rotor are reduced and the force gradient is moderated. This is accomplished by locating the rotor between two concentric stator coil assemblies either of which may be used for bearing or torquing to join the rotor magnets via magnetically "soft" iron, thereby reducing the rotor mass and inertia with the consequent improvement in dynamic performance. Since the forces on the rotor are the sum of the forces produced by each individual stator coil, it is possible to combine groups of stator coils in various ways and independently control them to achieve the dual purpose. Radial position sensors and commutation sensors are included, the former to control currents in diagonally opposite pairs of stator coils in response to eccentricity as measured by the position sensors and the latter to make the resultant radial force independent of the rotor magnets angular position and polarity. The same commutation sensors also provide rotor angular information for smooth torque production in the normal manner.

7 Claims, 5 Drawing Sheets

COMBINATION ELECTRIC MOTOR AND MAGNETIC BEARING

BACKGROUND OF THE INVENTION

This invention relates generally to electrical motor type apparatus and more particularly to electromagnetic apparatus for supporting and/or centering a rotor of an electric motor while at the same time producing rotation and torque of the rotor. The invention, moreover, is directed to a means by which pairs of opposing segments of a brushless DC motor armature are individually commutated and controlled to produce forces which when combined generate forces orthogonal to the rotational axis and/or torques about the rotational axis in any desired direction whereby concentricity of the rotor is maintained and controllable without inhibiting rotation and torque production of the rotor.

While electric motors generally include means for providing rotor suspension and concentricity, such apparatus in the past has relied on external means such as mechanical bearings and bushings. The technique of utilizing magnetic bearings in such apparatus, however, is also known. This type of apparatus has been disclosed, for example, in applicant's prior U.S. Pat. Nos. 3,694,041 and 4,381,875. In both instances control of attractive mode magnetic fluxes was employed rather than by the direct control of armature currents.

Accordingly, it is an object of the present invention to provide an improvement in electrical motors.

It is a further object of the invention to provide an improved electrical motor configuration having reduced decentering forces as well as having lower rotor mass inertia.

It is yet another object of the invention to provide a brushless DC motor having improved means for maintaining rotor concentricity about its rotational axis.

And yet a further object of the invention is to provide an improvement of brushless DC motors wherein a simple configuration of the stator assembly is able to provide both a bearing function as well as a torque producing function of the rotor.

SUMMARY OF THE INVENTION

The objects of the present invention are fulfilled by a motor structure comprised of an armature or stator assembly comprised of mutually opposing winding segments operated in pairs and in which there is located a rotor consisting of a ring of spaced apart alternately polarized magnets equally spaced in a cylindrical configuration. In the preferred form, the stator assembly is comprised of two separate annular stator assemblies between which is located an annular rotor. The outer stator assembly is utilized, for example, to generate electromagnetic forces which torque the rotor to provide rotation while the inner stator assembly is utilized to produce selectively directed tangential forces which produce radial centering forces of the rotor about its rotational axis.

BRIEF DESCRIPTION OF THE DRAWINGS

The objects of the present invention and the attendant advantages thereof will become readily apparent by reference to the following drawings wherein like reference numerals refer to like components throughout, and wherein.

DETAILED DESCRIPTION OF THE INVENTION

This invention is based upon the independent commutation and control of pairs of opposing segments of an annular armature or stator for an electric motor in which there is located an annular rotor member comprised of a plurality of permanent magnet pairs whose polarity alternate. The control is implemented in such a manner that diametrically opposite segments produce oppositely direct tangential forces, resulting in a normal torque couple producing rotation of the rotor or like directed forces which are used to produce radial forces on the rotor for centering the rotor about its rotational axis.

Figure 1:
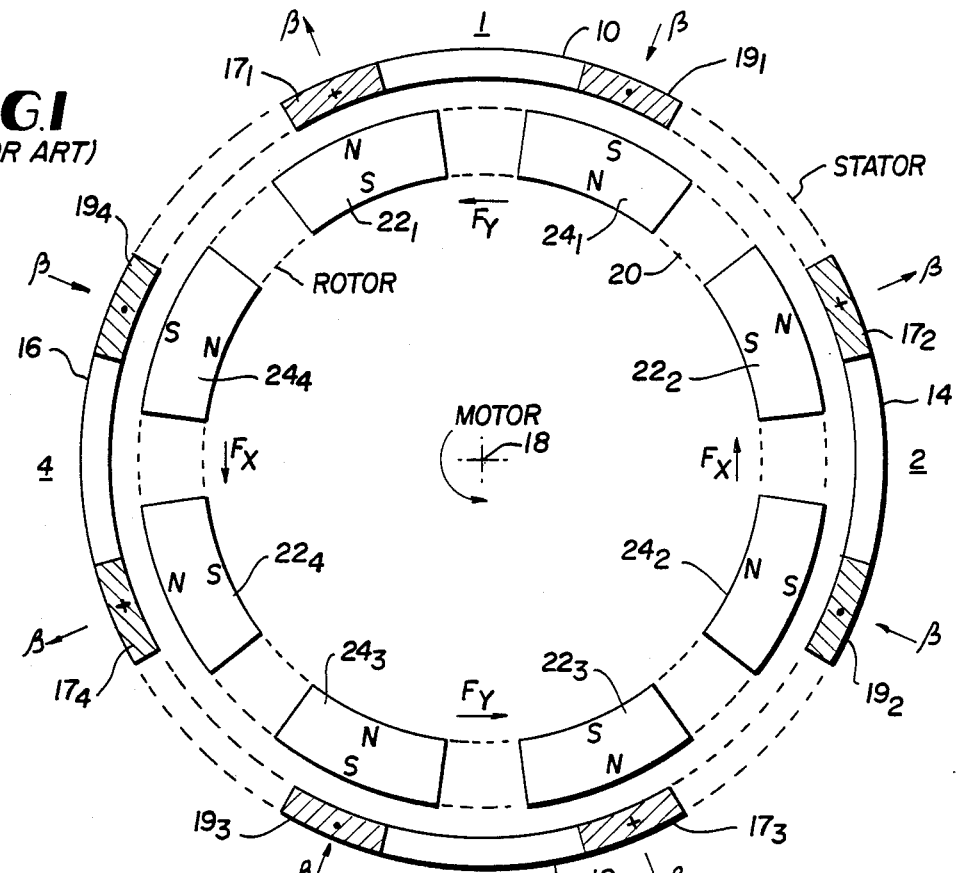
FIG. 1 is a transverse cross sectional view of a conventional eight pole permanent magnet rotor configuration encircled by a stator assembly which is energized to produce rotation of the rotor.
Figure 2:
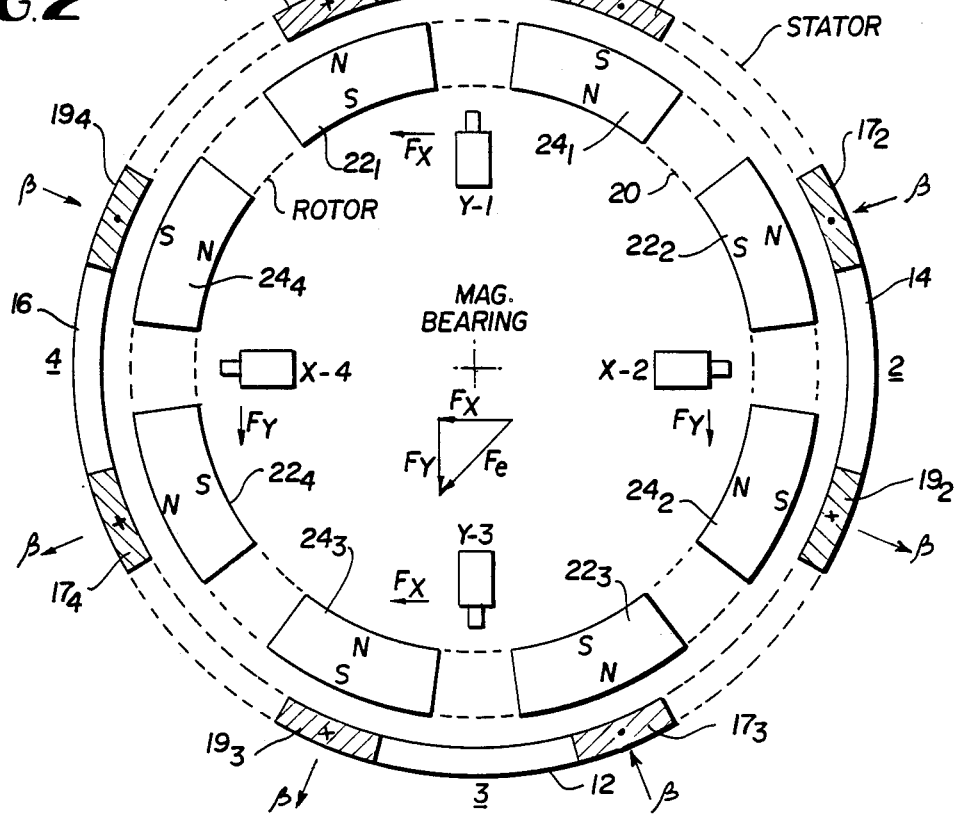
FIG. 2 is a transverse cross-sectional view of an eight pole permanent magnet rotor encircled by a stator assembly energized to produce a magnetic bearing for the rotor.

Referring now to the drawings and more particularly to FIGS. 1 and 2, if, for example, the armature or stator winding assembly of a brushless DC motor is divided into four quadrants, 1, 2, 3, and 4, mutually perpendicular pairs of windings 10, 12 and 14, 16 located thereat can be energized to generate torque producing couples in the same direction around a central axis 18 which will cause rotation of a rotor 20. This is shown in FIG. 1. The sum of the torque couples provides a measure of the torque output exerted on a shaft, not shown, coupled to the rotor.

Alternatively, the direction of one or more segment forces may be reversed in a direction, which will generate radial forces perpendicular to the central axis of rotation 18. This is shown in FIG. 2.

It is well known that force vectors oriented at 90° from one another can produce vector combinations in any direction. In FIG. 2, energization of stator cross segments 12 and 14 are reversed, which causes vector forces $F_x$ to the left in the X axis direction and $F_y$ downwardly in the Y axis direction. The magnitude of these component forces determines the angle and magnitude of the resultant force $F_e$. Thus without the addition of any additional structure but rather subdivision and independent control of sets of stator windings the dual function of torque production normally associated with a brushless DC motor and that of rotor suspension normally requiring accessory bearings can be accomplished in a manner to be described.

Figure 5:
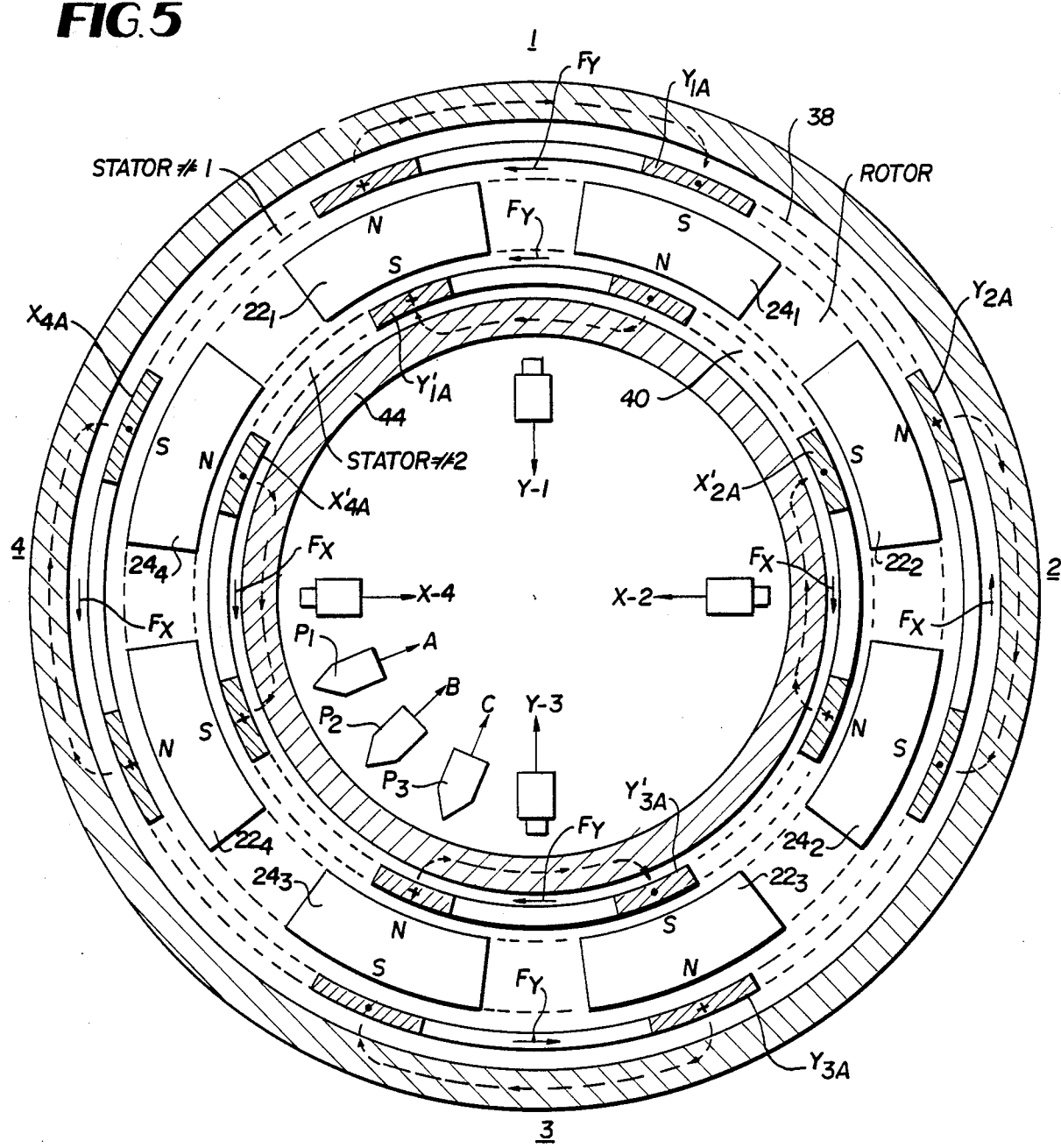
FIG. 5 is a transverse cross-sectional view illustrative of the preferred embodiment of the invention for providing both rotational and centering forces of an annular rotor.

The practical implementation of this technique, however, requires some attention to the specific design and construction. The attractive forces between the rotor and stator are typically $B^2$ forces and stronger than the stator forces (B x I) which produce torques. More importantly, if a ferrous stator is in close proximity to the rotor, meaning that a relatively small air gap exists therebetween, the force gradient will be very large. These radially directed forces normally cancel when the rotor is perfectly centered, but are destabilizing and increase dramatically with small eccentricities. To reduce this effect, the magnetic gap can be made larger than the physical gap such as found in a "surface wound motor" which has no "teeth" projecting towards the rotor or an "ironless armature" motor in which the rotor includes both the magnet assembly and the return path "iron". In the first instance, the force gradient is tolerably small and in the latter there is no static destabilizing force gradient. The present invention is applicable to either of these two configurations and in theory to any DC motor. The preferred embodiment, however, uses the "surface wound" motor construction as shown in FIGS. 1, 2 and 5.

Prior to discussing the preferred embodiment of the invention, however, it will be better understood by first considering the details of the structure shown in FIGS. 1 and 2. In FIG. 1, the rotor 20 is shown including four sets of two permanent magnets 22 and 24 of mutually opposite polarity. More particularly and as further shown in FIG. 3, four stator coils 10, 12, 14 and 16 are configured in a generally planar rectangular shape with parallel elongated leg portions 17 and 19 being separated by the distance between a respective pair of alternately poled rotor magnets 22 and 24. Specifically, when rotor magnets $22_1$ and $24_1$ underlie the legs $17_1$ and $19_1$ of the stator coil 10, the permanent magnets $22_2$ and $24_2$ underlie the leg portions $17_2$ and $19_2$ of stator coil 14, the permanent magnets $22_3$ and $24_3$ underlie the leg portions $17_3$ and $19_3$ of the stator coil 12 and permanent magnets $22_4$ and $24_4$ underlie the leg portions $17_4$ and $19_4$ of the stator coil 16.

The magnetic poles of the rotor magnets $22_1$ ... $24_4$ are equally spaced by being located 45° apart from each other. Moreover, the pole width of the rotor magnets $22_1$ ... $24_4$ are 30° with a 15° spacing between each magnet. Additionally, the leg portions $17_1$ ... $19_4$ of the stator coils have a coil width of 15°. This relationship holds for both transverse cross sections of the configurations shown in FIGS. 1 and 2 and the flat projections thereof shown in FIGS. 3 and 4, respectively, as well as the preferred embodiment shown in FIG. 5.

Figure 3:
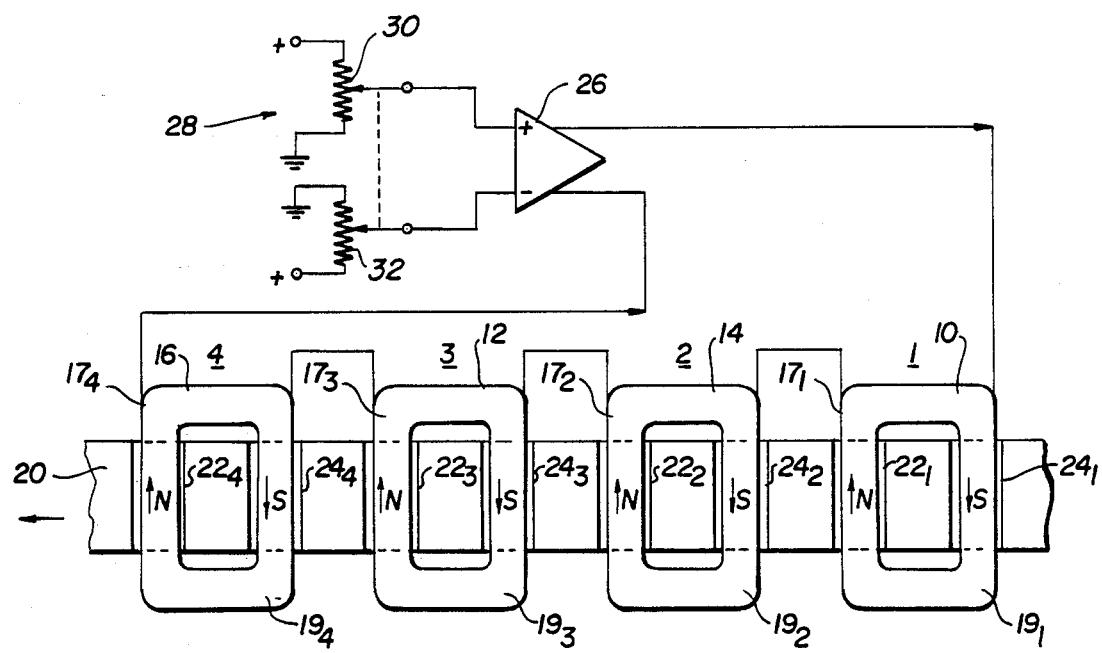
FIG. 3 is an electrical schematic diagram illustrative of a flat projection of the rotor and one phase of the coil assembly shown in FIG. 1 to provide a motor function.

FIG. 1 is intended to further illustrate that with stator and rotor configuration shown, if the stator coils 10, 12, 14 and 16 are connected in series as shown in FIG. 3 and energized such that the flux from coil legs $17_1$ ... $17_4$ is directed outward while flux in coil legs $19_1$ ... $19_4$ are directed inward, then the alternately poled magnets $22_1$ ... $22_4$ and $24_1$ ... $24_4$ subtending the coil legs and poles as shown in FIG. 1, will generate a torque couple F in the same, i.e., counterclockwise direction. Clockwise rotation of the rotor 20 can be obtained by simply reversing the direction of current in the stator coils 10, 12, 14 and 16. This control is implemented, for example, by the circuitry shown in FIG. 3 wherein a differential power amplifier 26 has its inputs connected to a potentiometer circuit configuration 28 comprised of two potentiometers 30 and 32 which are grounded at one end while their opposite ends are respectively connected to positive (+) or negative (−) like sources of potential, not shown. The wiper portions of the potentiometers 30 and 32 are ganged together and respectively couple to the inputs of the power amplifier 26. The circuit configurations of FIGS. 1 and 3 thus implement a one phase of a multiple phase electric motor configuration.

Figure 4:
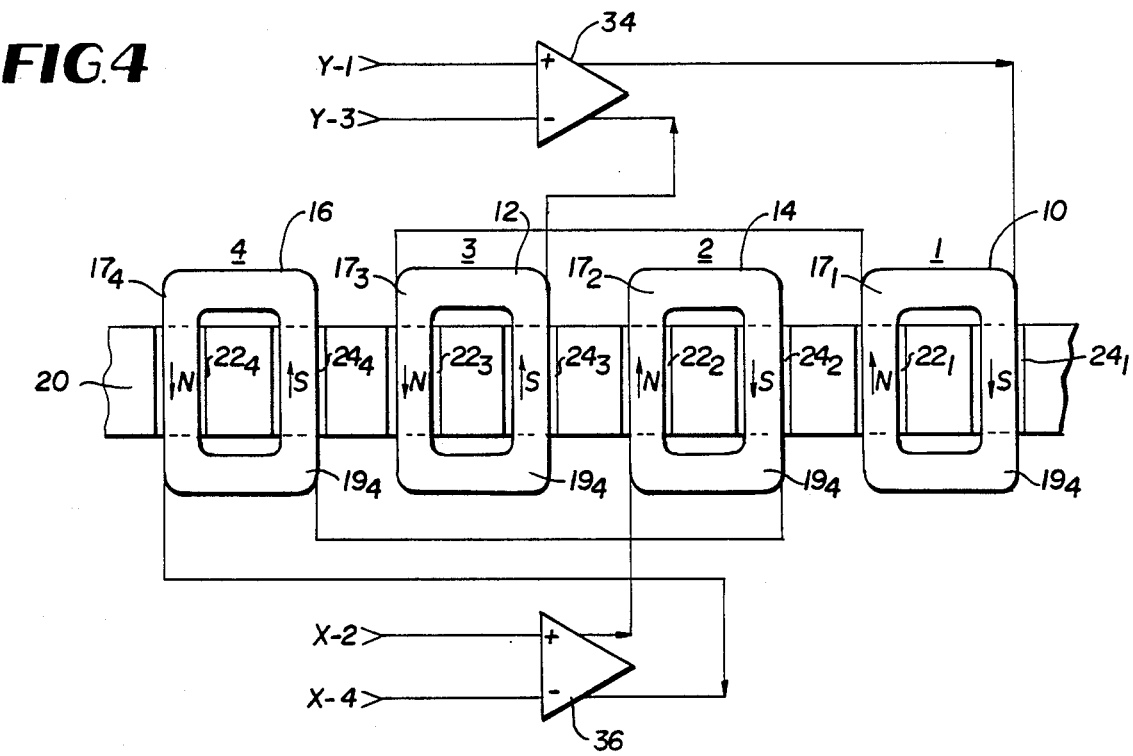
FIG. 4 is an electrical schematic diagram illustrative of a flat projection of the rotor and one phase of the stator coil assembly of FIG. 2 to provide a magnetic bearing function.

Considering now FIGS. 2 and 4, what is shown thereat is an implementation of a magnetic bearing function for the rotor 20 using the same set of coil windings 10, 12, 14 and 16 used for the motor configuration. However, mutually opposing coil pairs, i.e. 10, 12 and 14, 16 are connected in series opposition as shown in FIG. 4 and energized separately. In FIG. 4, stator windings 10 and 12, for example, are connected to power amplifier 34 such that the current directions in the legs $17_1$ and $17_2$ as well as $19_1$ and $19_3$ are in opposite directions. In a like manner, the stator coils 14 and 16 are coupled to a power amplifier 36.

Control inputs to the power amplifier 34 are from a pair of axial position sensors Y-1 and Y-3 located along the Y axis (FIG. 2) while the control inputs to the power amplifier 36 are from a pair of axial position sensors X-2 and X-4 positioned along the X axis. By being connected in series opposition, energization of the coil pairs will generate radial forces on the respective underlying alternately poled magnet pairs along both the X and Y axes. As shown in FIG. 2, coil windings 10 and 12 are energized such that current flow in leg portions $17_1$ and $19_3$ is in a first direction while the current flow in leg portions $19_1$ and $17_3$ is in the opposite or second direction. This causes a radial force $F_X$ along the X axis to the left, as shown, with respect to the rotor magnets $22_1$, $24_1$ and $22_3$, $24_3$. With respect to stator windings 14 and 16, current flow in the leg portions $19_2$ and $17_4$ is in the aforesaid second direction while the leg portions $17_2$ and $19_4$ have current flow directed in the aforesaid first direction as shown. This acts on the alternately poled rotor magnets $22_2$, $24_2$ and $22_4$, $24_4$ to generate a radial force $F_Y$ downward along the Y axis. Depending upon magnitude of the current generated in accordance with the outputs of the two power amplifiers 34 and 36 in response to the axial position sensors Y-1, Y-3, and X-2, X-4, a resultant radial vector force $F_E$ will be generated to center the rotor 20 about the rotational axis 18. Accordingly, the radial forces generated are proportional to the magnitude of the currents as well as the direction of the current flow in the respective stator coil pairs 10, 12 and 14, 16.

Commutation of other phase(s) allows these radial forces to be substantially unchanged for any angular orientation of the rotor just as continuous unidirectional torques are produced by a properly commutated DC motor.

Thus what has been shown and described up to this point is an electromagnetic structure wherein a segmented annular armature winding can be suitably energized to either rotate or position an annular rotor structure which is comprised of sets of alternately poled permanent magnet elements.

Referring now to FIG. 5, four sets of alternately poled permanent magnets $22_1$, $24_1$ ... $22_4$, $24_4$, are located on annular rotor 20 between two annular stator coil assemblies 38 and 40 either of which may be comprised of segmented coil configurations. The outer stator assembly 38 comprises a three phase (3φ) winding configuration of which only one phase, for example $\phi_A$, is shown including winding $Y_{1A}$, $Y_{3A}$, $X_{2A}$ and $X_{4A}$. Similarly, the inner stator assembly 40 is also comprised of a 3$\phi$ winding configuration of the the $\phi_A$ portion is comprised of segmented windings $Y'_{1A}$, $Y'_{3A}$, $X'_{2A}$ and $X'_{4A}$. In addition to the rotor position sensors Y-1 and Y-3 for the Y axis and X-2 and X-4 for the X axis as shown in FIG. 2, the embodiment of FIG. 5 also includes three angular position sensors $P_1$, $P_2$ and $P_3$ for effecting 3$\phi$ commutation for the phases A, B and C.

Associated with the rotor-stator structure of FIG. 5, there is also included an outer smooth bore cylinder 42 comprised of laminated rings of magnetically permeable material which serves as a flux return path for magnetic flux generated by the permanent magnet rotor magnets 22 and 24, circumferentially between adjacent alternately poled permanent magnet elements 22 and 24 of the rotor 20. Similarly, an inner smooth bore cylinder 44 of magnetically permeable material is located adjacent the inner stator assembly 40 and acts as a flux return path for the magnetic flux.

In the embodiment of FIG. 5, the motor function is provided by the outer stator coil assembly 38 while the bearing function is provided by the inner stator coil assembly 40. The outer stator coil assembly 38 furthermore is shown, moving clockwise, comprised of four stator coil segments $Y_{1A}$, $X_{2A}$, $Y_{3A}$ and $X_{4A}$ and correspond to the stator coil segments 10, 14, 12 and 16 shown in FIG. 1. The inner stator coil assembly 40 is similarly comprised of four stator coil segments $Y'_{1A}$, $X'_{2A}$, $Y'_{3A}$ and $X'_{4A}$ and comprise coil segments 10, 14, 12 and 16 shown in FIG. 2 with the exception that it is now located inwardly of the rotor 20 rather than externally thereto.

Figure 6:
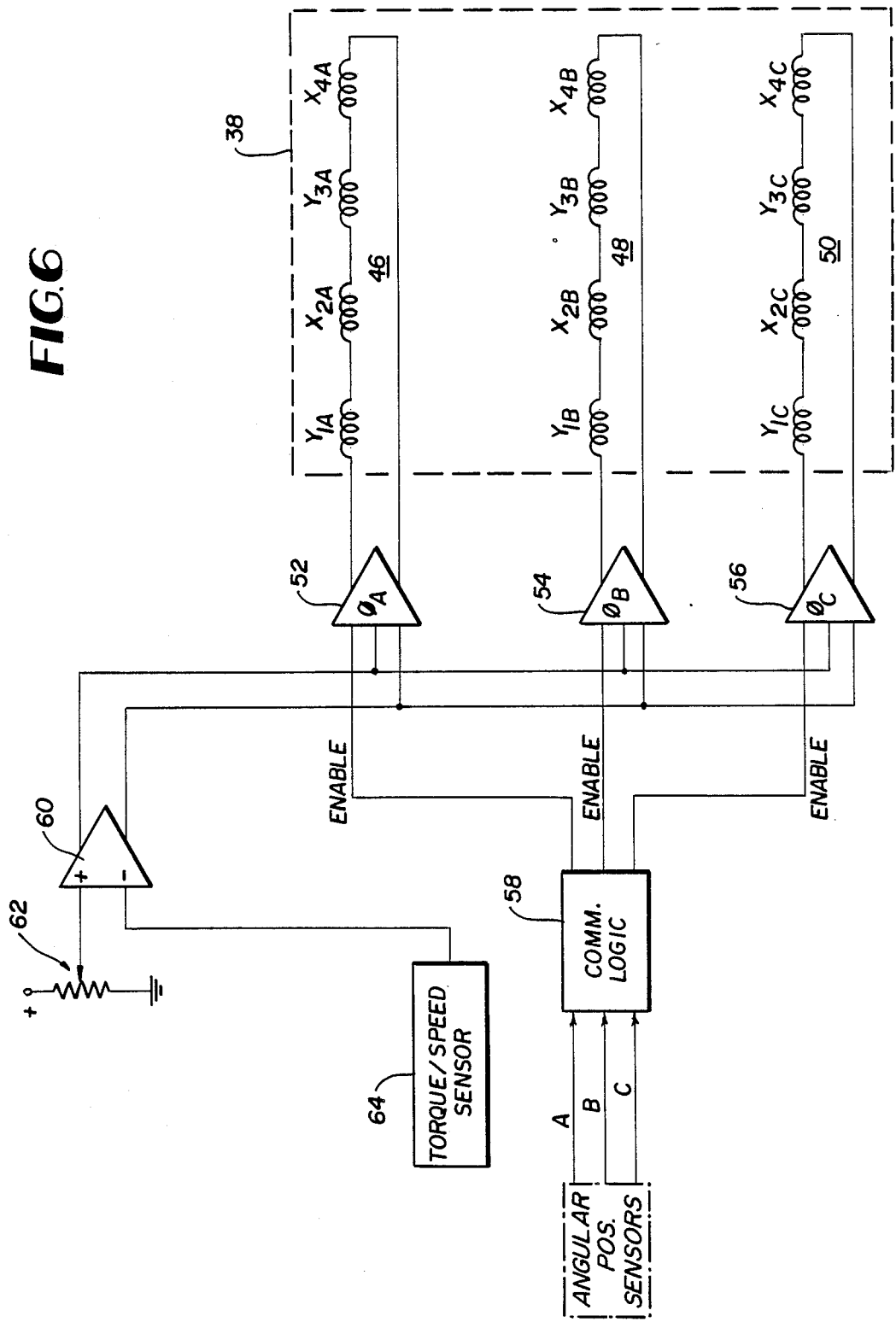
FIG. 6 is an electrical schematic diagram illustrative of a three phase energization circuit for providing control of the rotation of the rotor shown in the embodiment of FIG. 5.

Circuitry for energizing the outer stator coil assembly 38 in a 3$\phi$ circuit arrangement is shown in FIG. 6. Referring now to FIG. 6, the stator coil assembly 38 is shown comprising three sets of stator coils 46, 48 and 50, each comprised of four coil segments as shown in FIG. 5 for the phases A, B, and C. Three separate power amplifiers 52, 54 and 56 are respectively coupled to and drive the stator coils 46, 48 and 50 and receive a separate enabling input signal from a commutation logic circuit 58 which is coupled to the outputs of three angular position sensors $P_1$, $P_2$ and $P_3$ shown in FIG. 5 providing the signals A, B and C in a 3$\phi$ sequence. The magnitude of coil energization by the amplifiers 52, 54 and 56 is determined by the output of a differential amplifier 60. The output of the differential amplifier 60 comprises the difference between a predetermined desired speed motor as obtained from the slider of a potentiometer 62 coupled across a source of potential, not shown, while the other input to the differential amplifier comprises the output of a torque or speed sensor 64 which provides a signal corresponding to actual motor speed. The output of the differential amplifier comprises then the difference or error signal between the selected and actual motor speed or torque and control is thus provided by well known feedback control techniques.

Figure 7:
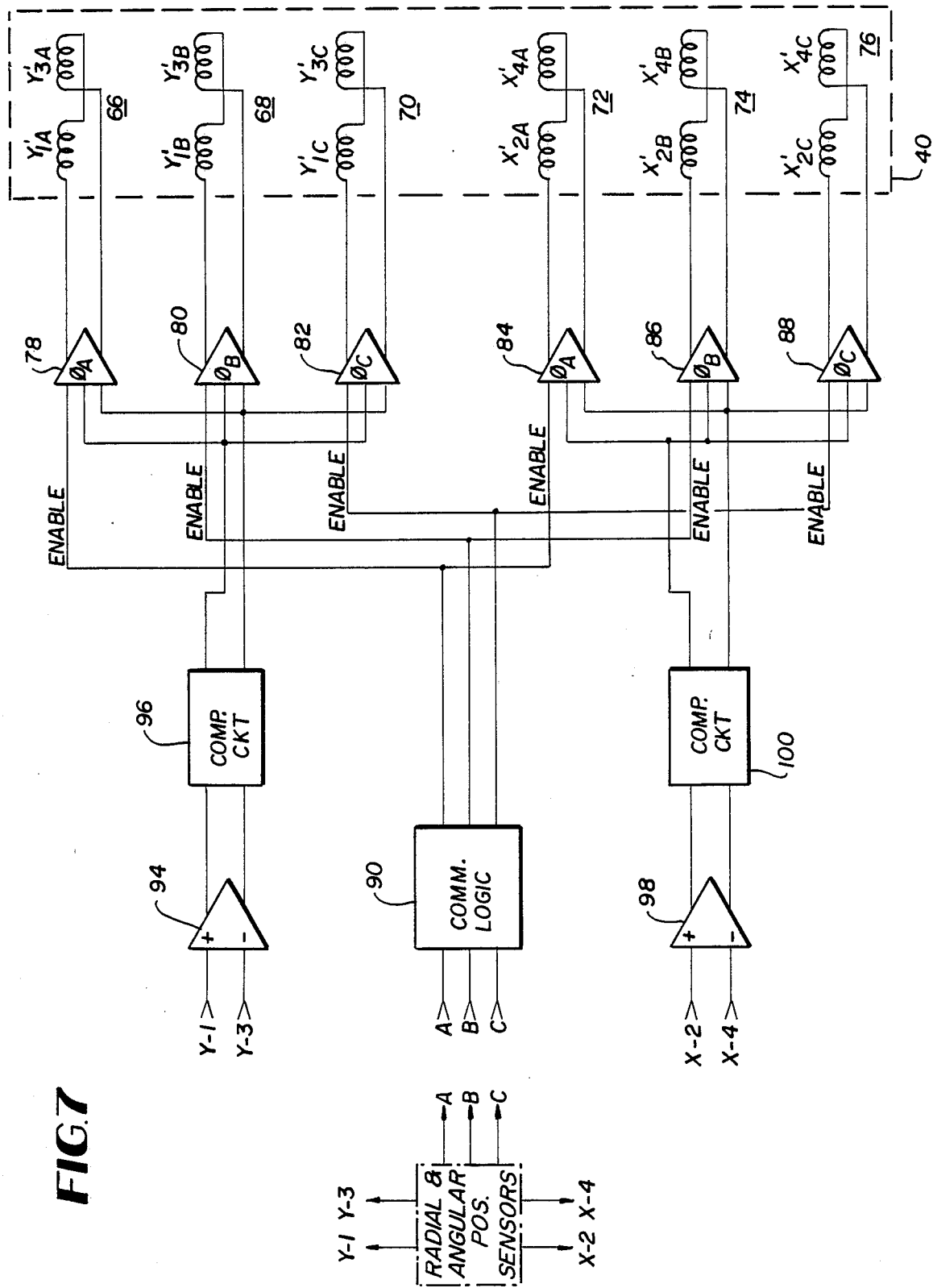
FIG. 7 is an electrical schematic diagram illustrative of a three phase energization diagram for providing a magnetic bearing function of the embodiment shown in FIG. 5.

Insofar as the magnetic bearing function of the embodiment shown in FIG. 5 is concerned, as 3$\phi$ circuit configuration therefor is also illustrated in FIG. 7. As shown in FIG. 7, the inner stator coil assembly 40 comprises six sets of coil windings 66, 68, 70, 72, 74 and 76 connected in series opposing pairs. Coil pairs 66 and 72 are utilized in connection with $\phi$A, whereas coil pairs 68 and 74 are utilized in connection with $\phi$B and 70 and 76 are utilized in connection with $\phi$C. The coil pairs, moreover, are controlled and energized by six driver amplifiers 78, 80, 82, 84, 86, and 88 as shown. The power amplifiers 78, 80, 82 provide outputs in accordance with the output of differential amplifier 94, i.e. proportional to the deviation of the rotor 20 from its central position along the Y axis. The amplifiers 78, 80, 84 are enabled in accordance with signals from a commutation logic circuit 90 to accommodate the angular position of the permanent magnet rotor 20. Likewise, power amplifiers 84, 86 and 88 provide outputs in accordance with the output of differential amplifier 98 which is proportional to the deviation of the rotor 20 from its central position along the X axis. Similarly, the amplifiers 84, 86 and 88 are enabled in accordance with signals from the commutation logic circuit 90. The commutation logic circuit 90 receives three inputs from the angular position or phase sensors $P_1$, $P_2$ and $P_3$ (FIG. 5) which are positioned 30° apart and provide signal outputs of A, B and C, respectively.

The axial position sensor outputs Y-1 and Y-3 (FIG. 5) for the Y axis are coupled to a differential amplifier 94 whose output is coupled to the driver amplifiers 78, 80 and 82 through a compensation circuit 96 which tailors the frequency response to assure stability of the closed loop response. In the same manner, the axial position sensor outputs X-2 and X-4 for the X axis are coupled to a differential amplifier 98 which is coupled to the driver amplifiers 84, 86 and 88 through a compensation circuit 100. Any radial displacement of the rotor 20 from a centered position about the central axis 18 along the X and Y axes are sensed whereupon a differential output proportional to any radial displacement will be generated by the differential amplifiers 94 and 98 causing the appropriate coil pairs 66 ... 76 to be energized to provide the required radial centering forces on the rotor 20.

When desired, the functions of the inner and outer stator windings may be reversed. Also a different number of motor poles or armature winding phases or segments may be utilized to accomplish the same function. Likewise, the same control techniques may be applied to an ironless armature type motor construction which inherently has no radial destabilizing force which requires the flux return rings to be free to rotate with the rotor.

While separate motor and magnetic bearing functions are illustrated using the same components, it should also be noted that the two functions can be combined into one composite function, for example, by multiplexing techniques well known to those skilled in the art or electrically combining the energizing currents by well known additive or subtractive techniques. The latter technique would, however, by its very nature involve a more complicated design but is well within the skill of a qualified circuit designer.

The presently preferred embodiment, however, which comprises a brushless DC motor and magnetic bearing for the rotor using separate armature or coil assemblies, constitutes an arrangement which is readily understood and which is readily easy to implement.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

I claim:

1. A combined electric motor and magnetic bearing, therefor, comprising:
   an annular rotor including a plurality of alternately poled permanent magnets arranged in a ring of equally spaced pairs;
   an armature including two annular segmented stator coil assemblies, one of said stator coil assemblies being located interiorally of said rotor for producing radial forces and the other of said stator coil assemblies being located exteriorally of said rotor for producing torque couples on the rotor, each of said stator coil assemblies further comprising a plurality of mutually opposing pairs of stator coils located in relatively close proximity to the rotor, said stator coils having separated core portions providing current conduction in mutually opposite directions which interacts with a flux from a respective pair of adjacent alternately poled magnets of said plurality of alternately poled magnets to produce forces on said rotor in a predetermined direction;
   means for energizing said other stator coil assembly to produce torque couples in the same direction on the rotor to produce rotation thereof;
   means for sensing displacement of said rotor along two mutually orthogonal axes coincident with a central rotational axis of said rotor; and
   means responsive to said sensing means for energizing said one coil assembly to produce pairs of like directed radial forces along said axes which produce a resultant radial force to center and support said rotor about said rotational axis.

2. The combined motor and bearing as defined by claim 1 wherein said annular rotor includes at least four pairs of permanent magnets located on said rotor and which define quadrant pairs of permanent magnets and wherein said plurality of mutually opposing pairs of stator coils comprises two opposing pairs of stator coils.

3. The combined motor and bearing as defined by claim 2 wherein each pair of stator coils are located along each of said orthogonal axes.

4. The combined motor and bearing as defined by claim 1 further including first flux return path means located inwardly of said stator coil assemblies and said rotor, and second flux path return means located outwardly of said stator coil assemblies and said rotor.

5. The combined motor and bearing as defined by claim 1 wherein said plurality of mutually opposing pairs of stator coils of said one stator coil assembly are respectively coupled in series opposition to one another for producing respective radial forces in the same axial direction and wherein all of said stator coils of said other stator coil assembly are connected in series aiding relationship for producing torque couples in the same rotational direction about said central rotational axis.

6. The combined motor and bearing as defined by claim 1 further including magnetic flux return path means for both said one and other stator coil assemblies.

7. The combined motor and bearing assembly as defined by claim 6 wherein said magnetic flux return path means comprises a first annular ring of magnetically permeable material located inwardly of said one stator coil assembly for producing radial forces and a second annular ring of magnetically permeable material located exteriorally of said other stator coil assembly for producing torque couples.

* * * * *